US008355256B2

(12) United States Patent
Peng et al.

(10) Patent No.: US 8,355,256 B2
(45) Date of Patent: *Jan. 15, 2013

(54) MOUNTING APPARATUS FOR DATA STORAGE DEVICE

(75) Inventors: Wen-Tang Peng, Taipei Hsien (TW); Jia-Qi Fu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 687 days.

This patent is subject to a terminal disclaimer.

(21) Appl. No.: 12/562,151

(22) Filed: Sep. 18, 2009

(65) Prior Publication Data

US 2011/0049317 A1  Mar. 3, 2011

(30) Foreign Application Priority Data

Aug. 28, 2009  (CN) .......................... 2009 1 0306295

(51) Int. Cl.
*H05K 7/16* (2006.01)
*G12B 9/00* (2006.01)
(52) U.S. Cl. ....... 361/725; 361/727; 361/726; 248/27.1; 248/27.3; 235/441; 439/159
(58) Field of Classification Search .................. 248/27.1, 248/27.3, 298.1, 222.11; 361/725, 727, 726; 361/747, 754; 312/223.1, 223.2; 439/159; 235/441
See application file for complete search history.

(56) References Cited

U.S. PATENT DOCUMENTS

| | | | | |
|---|---|---|---|---|
| 6,022,228 A | * | 2/2000 | Kuo | 439/159 |
| 6,089,891 A | * | 7/2000 | Nishioka | 439/159 |
| 6,145,747 A | * | 11/2000 | Wu | 235/486 |
| 6,270,365 B1 | * | 8/2001 | Nishioka | 439/159 |
| 6,478,591 B1 | * | 11/2002 | Chang | 439/159 |
| 6,728,109 B1 | * | 4/2004 | Wu | 361/747 |
| 6,951,473 B2 | * | 10/2005 | Takahashi et al. | 439/327 |
| 7,031,150 B2 | * | 4/2006 | Chen et al. | 361/679.33 |
| 7,068,502 B2 | * | 6/2006 | Chen et al. | 361/679.39 |
| 7,542,281 B2 | * | 6/2009 | Liang et al. | 361/679.39 |
| 7,543,786 B2 | * | 6/2009 | Yang | 248/222.51 |
| 7,611,100 B2 | * | 11/2009 | Peng et al. | 248/27.1 |
| 7,823,934 B2 | * | 11/2010 | Huang et al. | 292/143 |
| 7,841,565 B2 | * | 11/2010 | Peng et al. | 248/27.1 |
| 2002/0008142 A1 | * | 1/2002 | Takayasu et al. | 235/441 |

* cited by examiner

*Primary Examiner* — Kimberly Wood
(74) *Attorney, Agent, or Firm* — Altis Law Group, Inc.

(57) ABSTRACT

A mounting apparatus is provided for holding a data storage device. The mounting apparatus includes a bracket to receive the data storage device, and a latching unit. The bracket includes a first side plate. The latching unit includes a fixing tray fixed to the first side plate, a sliding member slidably mounted in the fixing tray, and a pushing member pivotably mounted to the fixing tray. The pushing member includes a pressed portion operable of resisting against the sliding member, and a moving portion to abut against the data storage device. When the sliding member is slid in the fixing tray to move the pressed portion, the pushing member is rotated. Therefore, the moving portion is rotated to eject the data storage device from the bracket.

15 Claims, 6 Drawing Sheets

MOUNTING APPARATUS FOR DATA STORAGE DEVICE

CROSS-REFERENCE TO RELATED APPLICATION

This application is related to a U.S. patent application, entitled "MOUNTING APPARATUS FOR DATA STORAGE DEVICE", with the application Ser. No. 12/558,581, and filed on Sep. 14, 2009, which is assigned to the same assignee as the present application.

BACKGROUND

1. Technical Field

The disclosure relates to mounting apparatuses for data storage devices, and particularly to a mounting apparatus that readily secures or removing a data storage device to or from a computer enclosure.

2. Description of Related Art

Generally speaking, when a computer is assembled, a rack is mounted in a computer enclosure, and then data storage devices are attached to the rack by screws. However, during installation or removal of the data storage devices, one or more of panels of the computer enclosure must be removed. During removal of the data storage devices, the screws must further be removed one by one to free the data storage devices after removing the panels of the computer enclosure. This is time-consuming and cumbersome. In addition, in this process, one or more of the screws can easily fall into the packed interior of the computer enclosure, thereby creating a difficult retrieval.

DETAILED DESCRIPTION

Figure 1:
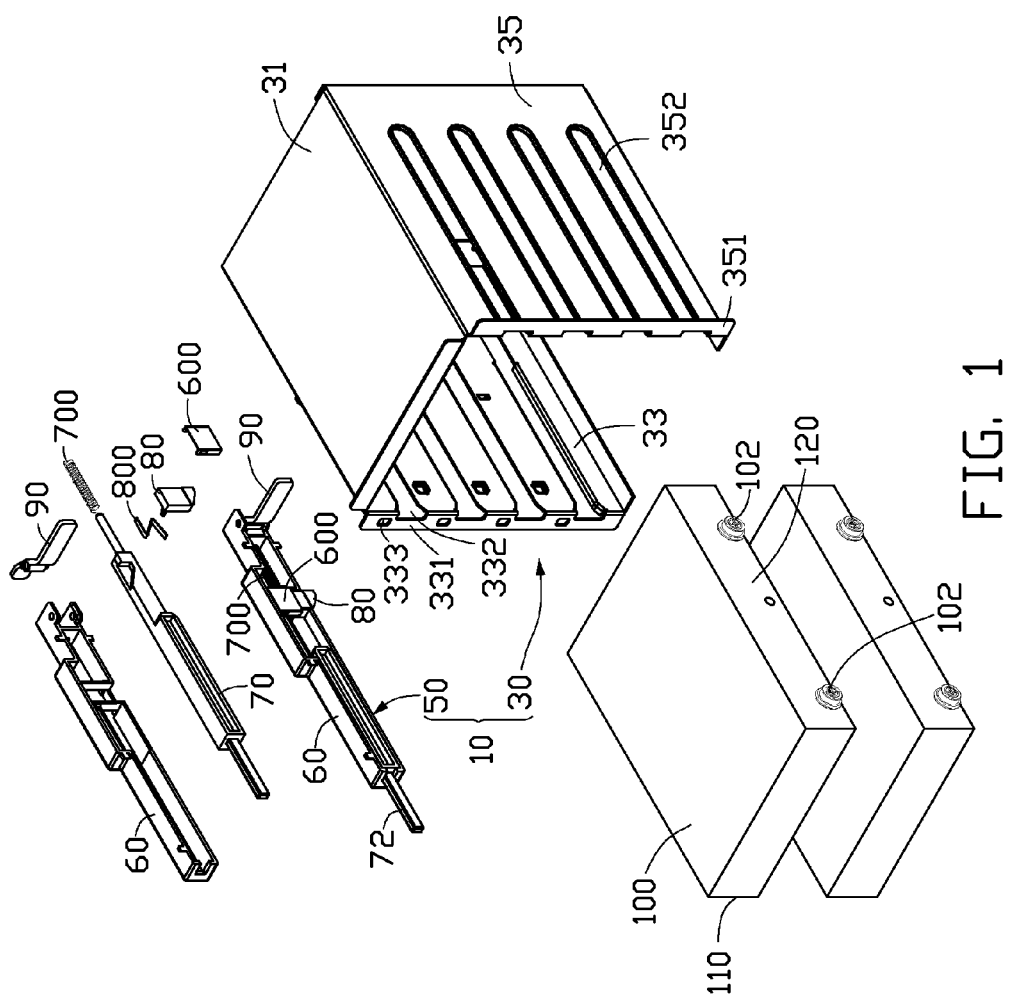
FIG. 1 is an exploded, isometric view of an exemplary embodiment of a mounting apparatus with two data storage devices, the mounting apparatus including a latching unit.
Figure 2:
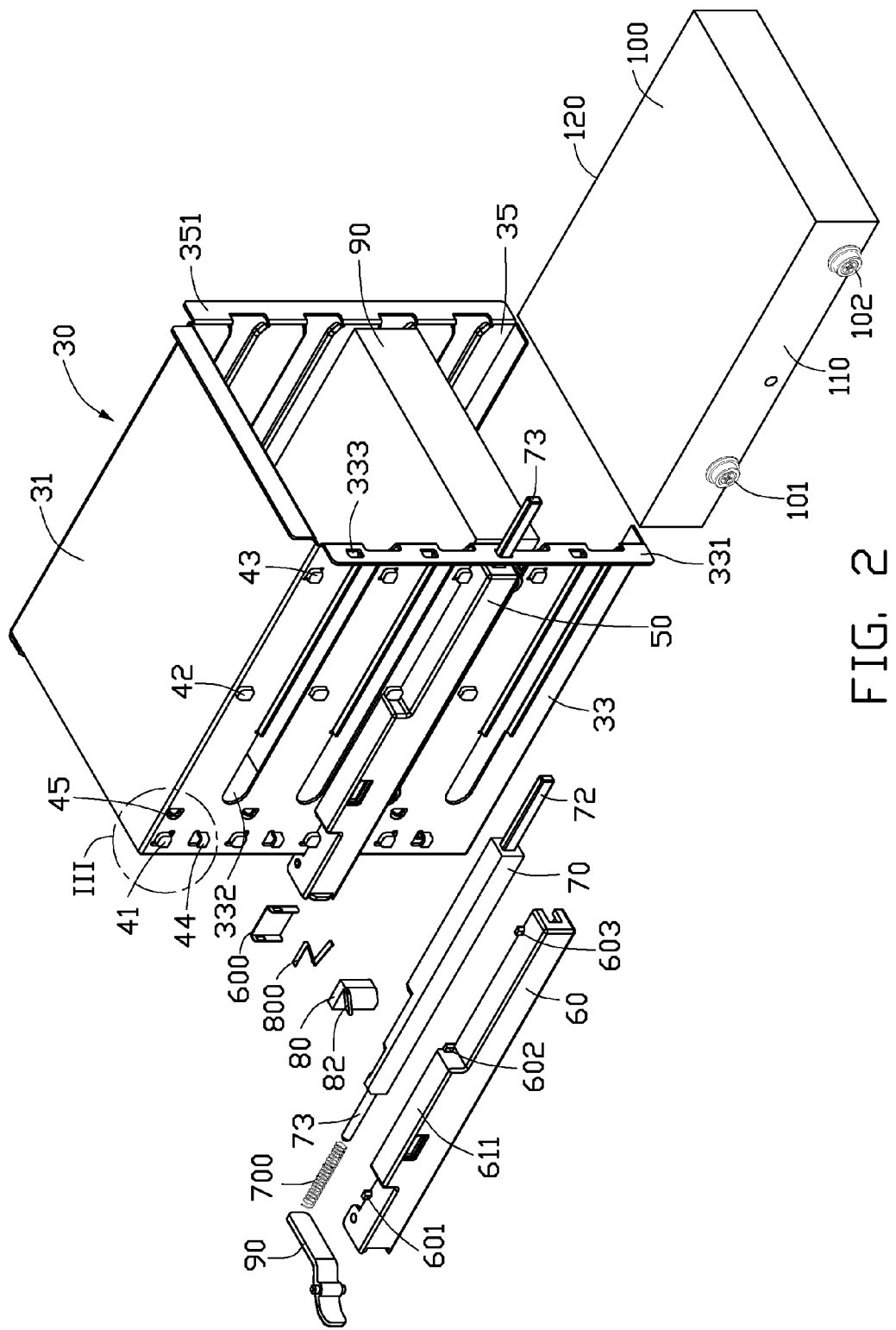
FIG. 2 is a partially assembled, isometric view of FIG. 1, but viewed from another perspective.

Referring to FIGS. 1 and 2, an exemplary embodiment of a mounting apparatus 10 is provided to receive at least one data storage device 100. In this embodiment, the mounting apparatus 10 receives two data storage devices 100, each including a first sidewall 110 and a second sidewall 120 opposite to the first sidewall 110. A first post 101 and a second post 102 protrude from the first sidewall 110, and a plurality of second posts 102 extend from the second sidewall 120. The first post 101 is situated adjacent to a rear end of the first sidewall 110, and the second post 102 is situated adjacent to a front end of the first sidewall 110. In this embodiment, the first and second posts 101 and 102 are heads of screws mounted to the data storage devices 100.

The mounting apparatus 10 includes a bracket 30 for receiving the data storage devices 100, and two latching unit 50.

The bracket 30 is generally n-shaped, and includes a top plate 31, a first side plate 33 and a second side plate 35 extending perpendicular from opposite sides of the top plate 31.

Figure 3:
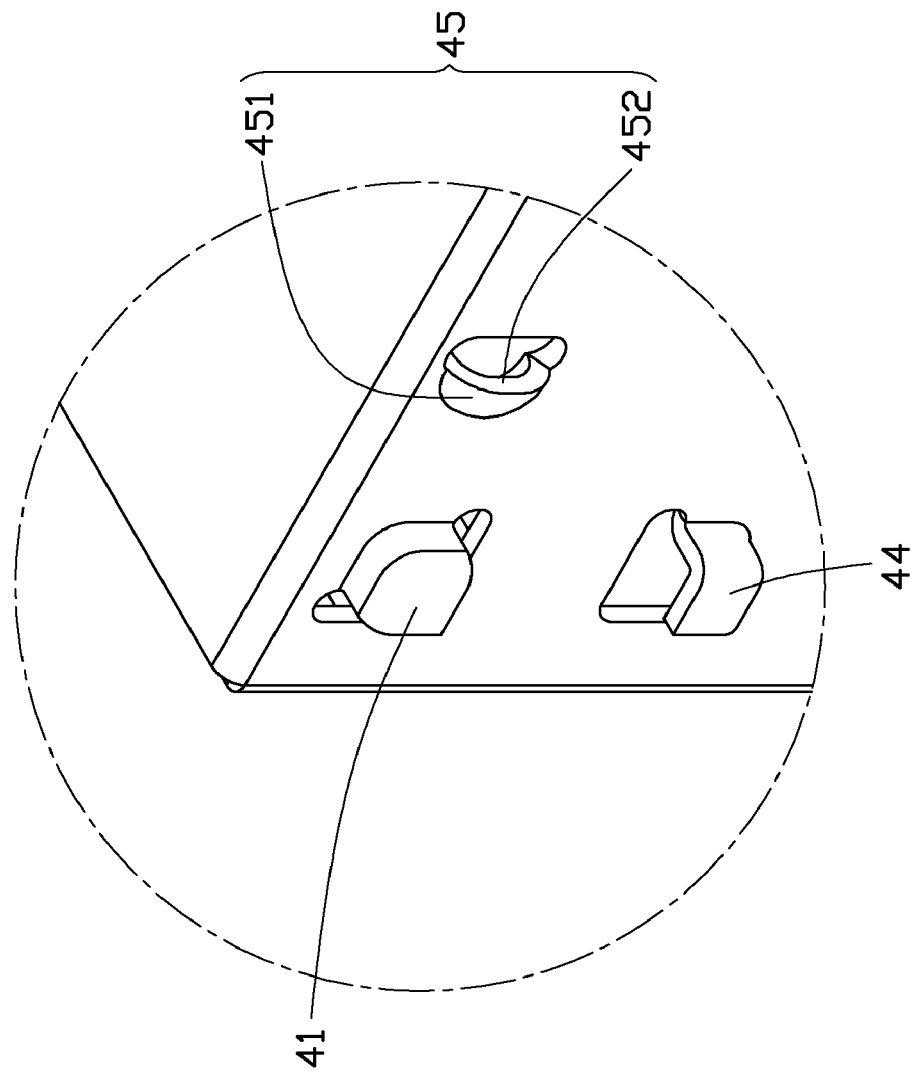
FIG. 3 is an enlarged view of the circled portion III of FIG. 2.
Figure 6:
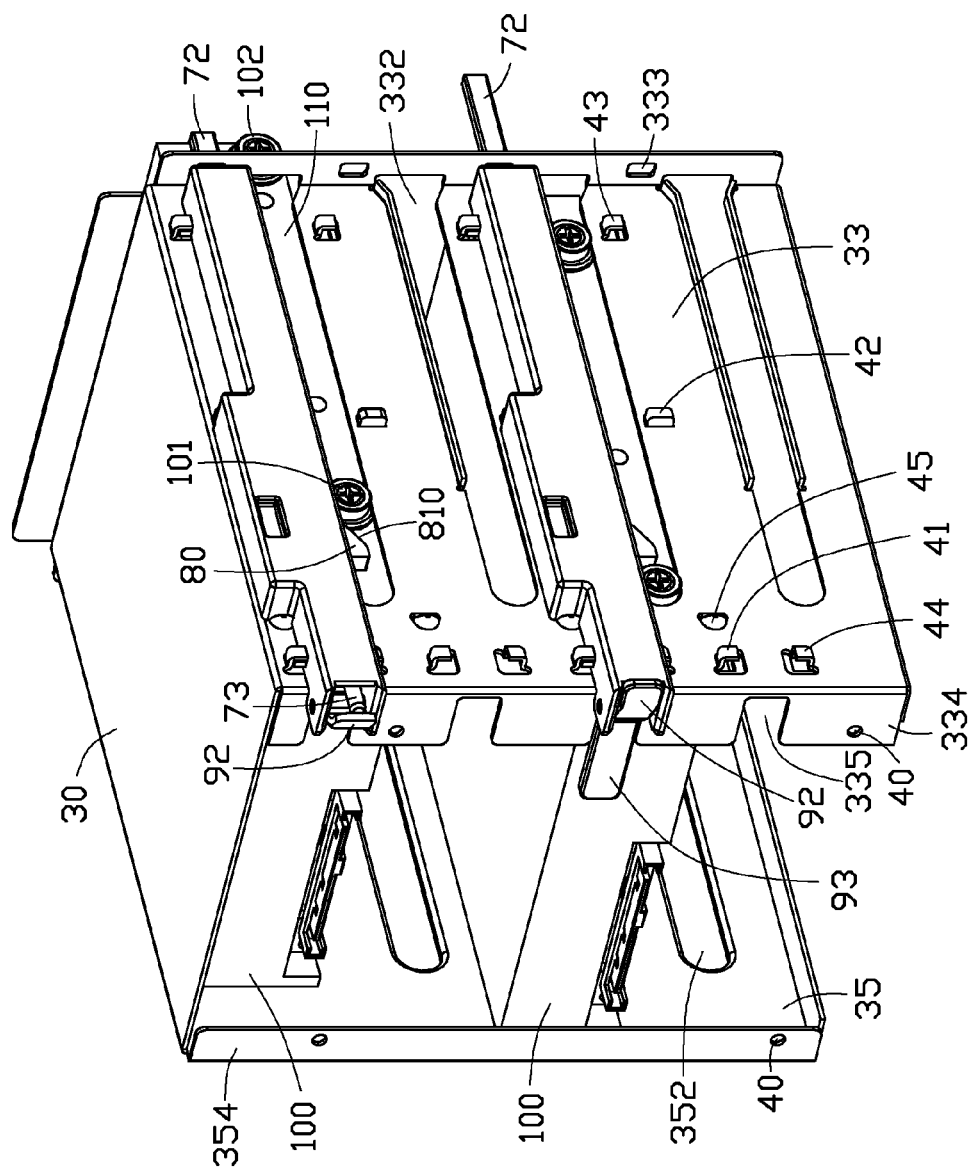
FIG. 6 is an assembled, isometric view of the mounting apparatus of FIG. 1, but viewed from another perspective.

A mounting tab 331 extends perpendicular from a front end of the first side plate 33. The mounting tab 331 defines a plurality of through holes 333. Referring to FIG. 6, a resisting tab 334 extends perpendicular inward from a rear end of the first side plate 33. The resisting tab 334 defines a plurality of receiving cutouts 335, and a plurality of fixing holes 40 for fixing the resisting tab 334 to an enclosure (not shown). The first side plate 33 transversely defines a plurality of sliding grooves 332, parallel to the top plate 31 and extending through the mounting tab 331. Each sliding groove 332 is located between two corresponding neighboring through holes 333. A first clipping portion 41, a second clipping portion 42, and a third clipping portion 43, in alignment with one another, protrude from the first side plate 33, above the corresponding sliding groove 332. The first and third clipping portions 41 and 43 are respectively located adjacent to the rear end and the front end of the first side plate 33. A fourth clipping portion 44 below and opposite to the first clipping portion 41 protrudes from the first side plate 33. A cambered fixing portion 45 protrudes from the first side plate 33, and between the first and second clipping portions 41, 42. Referring to FIG. 3, the fixing portion 45 includes a curved guiding surface 451, and a resisting end 452 perpendicular to the first side plate 33.

A flange 351 extends out from a front end of the second side plate 35, and a fixing flange 354 (shown in FIG. 6) extends inward from a rear end of the second side plate 35. The fixing flange 354 defines a plurality of fixing holes 40 for fixing the fixing flange 354 to the enclosure. A plurality of mounting grooves 352 is defined in the fixing flange 354, correspondingly aligning with the corresponding sliding grooves 332 of the first side plate 33. Each mounting groove 352 extends transversely through the flange 351.

Figure 4:
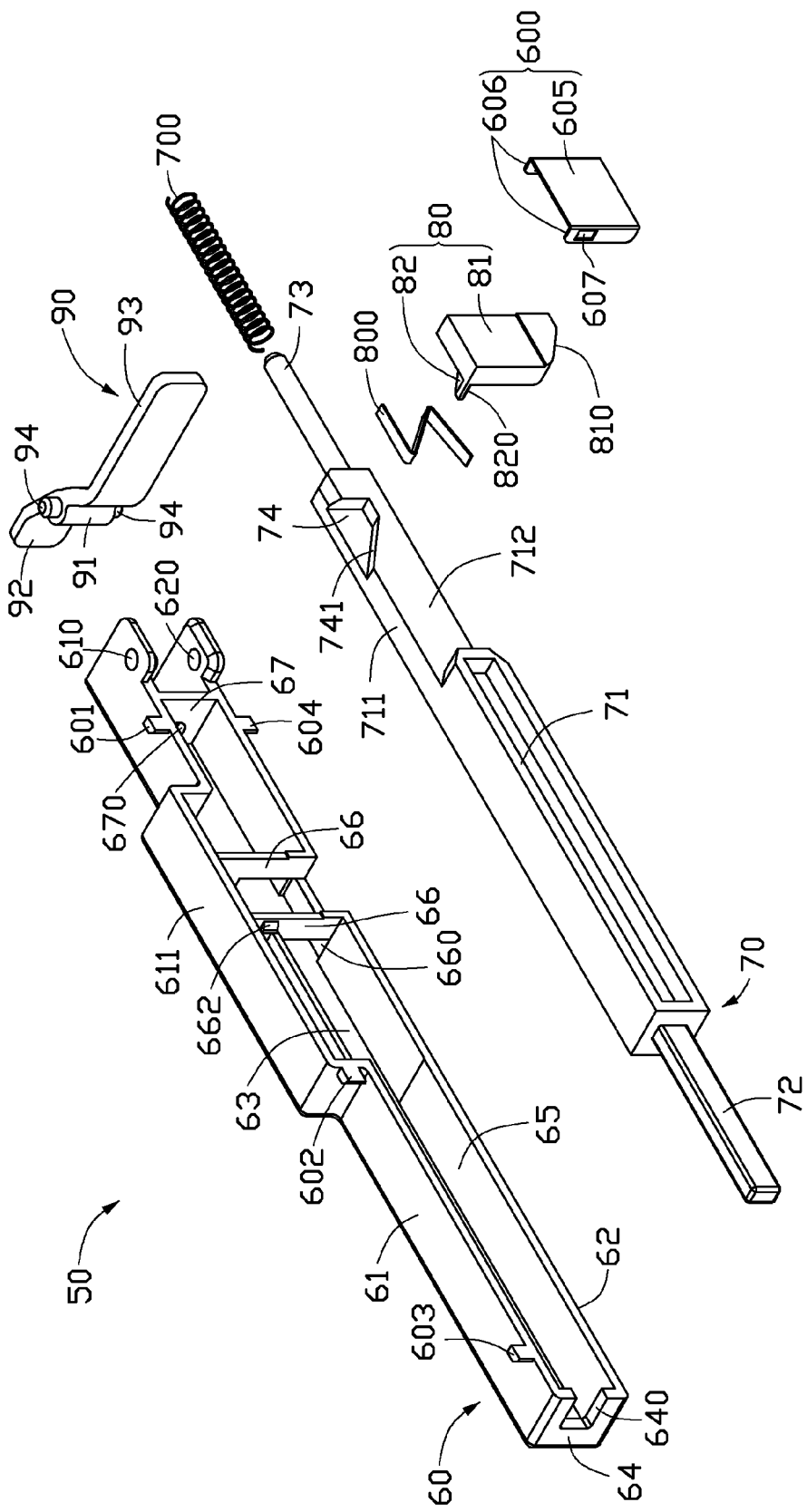
FIG. 4 is an enlarged view of the latching unit of FIG. 1.

Referring to FIG. 4, each latching unit 50 includes a fixing tray 60, a fastening member 600, a sliding member 70, a spring 700, a resisting member 80, a substantially Z-shaped resilient member 800, and a pushing member 90.

The fixing tray 60 includes a side panel 63, a top panel 61 and a bottom panel 62 correspondingly extending from a top side and a bottom side of the side panel 63, and a fixing wall 64 connected to corresponding first ends of the side panel 63, the top panel 61, and the bottom panel 62. A protrusion 611 protrudes from a middle of the top panel 61. A fixing post 602 extends towards the fixing wall 64 from a first end of the protrusion 611, parallel to the top panel 61. A first fixing peg 601 and a second fixing peg 603 protrude from the first end and a second end opposite to the first end of the top panel 61. A third fixing peg 604 extends from the bottom panel 62, in alignment with the first fixing peg 601. Two aligned shaft holes 610, 620 are correspondingly defined in the second ends of the top panel 61 and the bottom panel 62. An opening 640 is defined in the fixing wall 64. The top panel 61, the side panel 63, and the bottom panel 62 together form a holding space 65 for receiving the sliding member 70. Two parallel fixing boards 66 are formed in the holding space 65, parallel to the fixing wall 64 and connected to the protrusion 611 and the bottom panel 62. A sliding slot 660 is defined in each fixing board 66, and extends to the side panel 63. A clamping protrusion 662 extends from a side away from the other fixing board 66 of each fixing board 66, parallel to the fixing wall 64. A resisting board 67 defining a through hole 670 is formed in the holding space 65, and located between the first fixing peg 601 and the shaft hole 610.

The sliding member 70 includes a sliding body 71, a pushing portion 72 extending from a first end of the sliding body 71, and a mounting shaft 73 extending from a second end opposite to the first end of the sliding body 71. A mounting groove 74 is defined in the sliding body 71, adjacent to the mounting shaft 73. The mounting groove 74 includes an angled surface 741, away from the mounting shaft 73.

The resisting member 80 includes a main body 81, and an angled rim 82 extending from one side of the main body 81. The main body 81 includes an angled guiding surface 810, and the angled rim 82 includes a resisting surface 820.

The fastening member 600 includes a cover 605 and two fixing flanges 606 extending from opposite ends of the cover 605. Each fixing flange 606 defines a fixing hole 607, for fixing the fastening member 600 to the fixing boards 66 of the fixing tray 60.

The pushing member 90 includes a pivoting portion 91, and a pressed portion 92 and moving portion 93 extending from opposite sides of the pivoting portion 91. Two pivoting shafts 94 extend from a top and a bottom of the pivoting portion 91, respectively.

Figure 5:
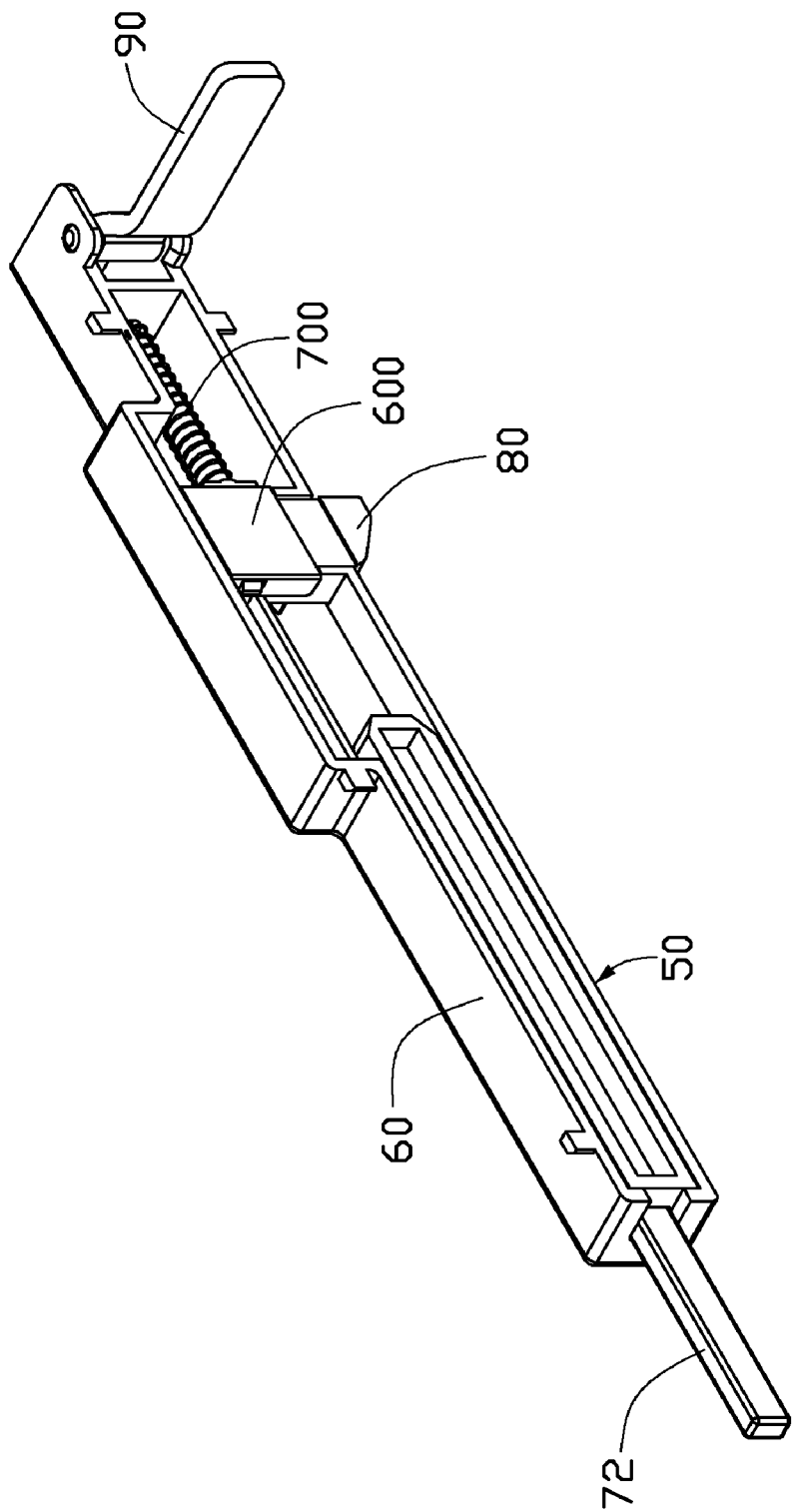
FIG. 5 is an assembled, isometric view of the latching unit of FIG. 4.

Referring to FIG. 5, during assembly of each latching unit 50, the spring 700 fits about the mounting shaft 73 of the sliding member 70. The sliding member 70 is received in the holding space 65 of the fixing tray 60, with the mounting shaft 73 together with the spring 700 passing through the sliding slots 660 of the fixing tray 60, and the mounting shaft 73 passing through the through hole 670 of the fixing tray 60. After the sliding member 70 is received in the holding space 65, the pushing portion 72 of the sliding member 70 is slidably engaged in the opening 640 of the fixing tray 60, and partly exposes outside of the holding space 65 capable of operating the sliding member 70. Accordingly, opposite ends of the spring 700 resist the sliding body 71 of the sliding member 70 and the resisting board 67 of the fixing tray 60. The mounting groove 74 of the sliding member 70 is located between the fixing boards 66. The angled rim 82 of the resisting member 80 is received in the mounting groove 74 of the sliding member 70. Therefore, the resisting surface 820 of the angled rim 82 resists the angled surface 741 of the mounting groove 74, and opposite sidewalls of the main body 81 of the resisting member 80 abut the fixing boards 66 respectively. The resilient member 800 is received in the holding space 65, with two ends of the resilient member 800 resisting the protrusion 611 of the fixing tray 60 and a top of the main body 81. The fixing holes 607 of the fastening member 600 engage the clamping protrusions 662 of the fixing boards 66, correspondingly. The fastening member 600 is thereby fixed to the fixing tray 60, and the cover 605 of the fastening member 600 resists the main body 81. The pivoting shafts 94 of the pushing member 90 pivotally engage the shaft holes 610 and 620 of the fixing tray 60, correspondingly. The pushing member 90 is thus pivotally mounted to the fixing tray 60, with the moving portion 93 away from the side panel 63 of the fixing tray 60, and exposing outside of the holding space 65.

In assembly of each latching unit 50 to the bracket 30, the pushing portion 72 of the latching unit 50 is retracted into the holding space 65 of the latching unit 50, such that the spring 700 is deformed. The latching unit 50 is mounted to an optional sliding groove 332 of the first side plate 33 of the bracket 30, and situated between the first and fourth clipping portions 41 and 44, with the holding space 65 facing the first side plate 33. Thus, the pushing member 90 faces the resisting tab 334 of the bracket 30. The fixing portion 45 of the bracket 30 is received in the holding space 65. The pushing portion 72 is in alignment with one of the through holes 333 of the bracket 30. The pushing portion 72 is released, and the spring 700 restores to drive the pushing portion 72 through the opening 640 of the fixing tray 60 and one of the through holes 333 in that order. When the latching unit 50 is moved towards the mounting tab 331 of the bracket 30, the first end of the protrusion 611 of the latching unit 50 is moved beyond the guiding surface 451 of the fixing portion 45. Accordingly, the first end of the protrusion 611 resists the resisting end 452 of the fixing portion 45, and the fixing post 602 of the latching unit 50 is clamped in the second clipping portion 42 of the bracket 30. Correspondingly, the first fixing peg 601, the second fixing peg 603, and the third fixing peg 604 of the latching unit 50 are clamped in the first, third, and fourth clipping portions 41, 43, and 44 of the bracket 30, respectively. Thus, the second portion 93 of the pushing member 90 is received in the corresponding receiving cutout 335 of the resisting tab 334 of the bracket 30.

Referring to FIG. 6, in use, each data storage device 100 is pushed into the bracket 30, and moved towards the resisting tab 334 of the bracket 30, with the first and second posts 101, 102 of the first sidewall 110 of the data storage device 100 sliding in the corresponding sliding groove 332 of the first side plate 33 of the bracket 30, and the plurality of second posts 102 of the second sidewall 120 of the data storage device 100 sliding in the corresponding mounting groove 352 of the second side plate 35 of the bracket 30. When the first post 101 is moved to resist the guiding surface 810 of the resisting member 80 of the latching unit 50, the resisting member 80 is moved into the holding space 65 of the latching unit 50. As a result, the resilient member 800 of the latching unit 50 is deformed. The first post 101 is moved over the guiding surface 810, the elasticity of the resilient member 800 moves the resisting member 80 to the outside of the holding space 65, to prevent the data storage device 100 from disengaging from the bracket 30.

In removal of each data storage device 100 from the bracket 30, the pushing portion 72 of the latching unit 50 is slid in the holding space 65 of the fixing tray 60 of the latching unit 50, whereby a distal end of the mounting shaft 73 is moved to the pressed portion 92 of the pushing member 90 of the latching unit 50. As a result, the pushing member 90 is rotated, as is, in turn, the moving portion 94, to eject the data storage device 100 from the bracket 30. Commensurately, the angled surface 741 of the sliding member 70 resists the resisting surface 820 of the resisting member 80, such that the resisting member 80 is moved into the holding space 65 of the latching unit 50. The data storage device 100 is thus readily removed from the bracket 30.

In other embodiments, the mounting tab 331 and the resisting tab 334 of the first side plate 33 of the bracket 30 may be omitted, as may the fixing flange 354 and the flange 351 of the second side plate 35. The guiding surface 810 of the resisting member 80 may also be omitted.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A mounting apparatus for a data storage device, the mounting apparatus comprising:
    a bracket to receive the data storage device, the bracket comprising a first side plate; and
    a latching unit comprising a fixing tray fixed to the first side plate, a sliding member slidably mounted in the fixing tray, and a pushing member pivotably mounted to the fixing tray, wherein the pushing member comprises a pressed portion operable of resisting against the sliding member, and a moving portion to abut against the data storage device;

wherein when the sliding member is slid in the fixing tray to move the pressed portion, the pushing member is rotated, with the moving portion rotated to eject the data storage device from the bracket.

2. The mounting apparatus of claim 1, wherein the fixing tray comprises a top panel, and a bottom panel opposite to the top panel, the pushing member is pivotably mounted between the top and bottom panels.

3. The mounting apparatus of claim 2, wherein the pushing member further comprises a pivoting portion, two opposite pivoting shafts protrude from the pivoting portion, the top panel and the bottom panel each define a shaft hole engaged with a corresponding pivoting shaft, respectively.

4. The mounting apparatus of claim 3, wherein the pressed portions And the moving portion extend from opposite sides of the pivoting portion.

5. The mounting apparatus of claim 1, wherein the siding member comprises a sliding body, the fixing tray defines a holding space, in which the sliding body is slidably received.

6. The mounting apparatus of claim 5, wherein the pushing member is pivotably mounted in the holding space, with the moving portion exposing out of the holding space, a mounting shaft extends from a first end of the sliding body, and resists against the pressed portion.

7. The mounting apparatus of claim 6, wherein a pushing portion extends out of the holding space from a second end opposite to the first end of the sliding body, for operating the sliding member to slide in the holding space.

8. The mounting apparatus of claim 1, wherein the fixing tray comprises a side panel, and a top panel and a bottom panel extending from a top side and a bottom side of the side panel, the top panel, the side panel, and the bottom panel together form a holding space, the sliding member comprises a sliding body slidably received in the holding space.

9. The mounting apparatus of claim 8, further comprising a spring, wherein a resisting board is formed in the holding space, opposite ends of the spring resist against the resisting board and the sliding member, respectively.

10. The mounting apparatus of claim 9, wherein a mounting shaft extends from the sliding body, and a through hole is defined in the resisting board, through which the mounting shaft passes to resist against the pressed portion.

11. The mounting apparatus of claim 8, wherein a fixing wall extends from an end of the side panel and connects to the top and bottom panels, and a pushing portion extends from the sliding body, with an opening defined in the fixing wall through which the pushing portion of the sliding member slidably passes.

12. The mounting apparatus of claim 8, further comprising a resisting member, wherein the sliding member defines a mounting groove, comprising an angled surface, the resisting member comprises an angled rim received in the mounting groove, the angled rim comprises a resisting surface resisting against the angled surface.

13. The mounting apparatus of claim 12, wherein two fixing boards are formed in the holding space, the resisting member is sandwiched between the fixing boards.

14. The mounting apparatus of claim 13, wherein each of the two fixing boards defines a sliding slot extending to the side panel, through which the sliding body of the sliding member freely passes.

15. The mounting apparatus of claim 12, further comprising a resilient member located in the holding space, wherein two ends of the resilient member resist against the top panel and a top of the resisting member.

* * * * *